United States Patent [19]

Rohde et al.

[11] Patent Number: 4,971,222
[45] Date of Patent: Nov. 20, 1990

[54] COFFEE FILTER DISPENSER

[76] Inventors: Eileen Rohde, 341 Unqua Rd., Massapequa, N.Y. 11758; Neil Rhode, 250 Windsor Ave., Rockville Centre, N.Y. 11570

[21] Appl. No.: 463,450

[22] Filed: Jan. 11, 1990

[51] Int. Cl.⁵ .............................................. B65G 59/00
[52] U.S. Cl. ..................................... 221/210; 221/220; 221/226; 221/255; 221/259; 294/33; 294/99.2
[58] Field of Search ........................ 221/36, 40, 45, 56, 221/59, 63, 210, 213–216, 220, 221, 226, 228, 229, 255, 259; 294/1.1, 33, 32, 99.1, 99.2

[56] References Cited

U.S. PATENT DOCUMENTS

| | | | |
|---|---|---|---|
| 3,776,419 | 12/1973 | Zinkgraf et al. | 221/197 |
| 4,093,297 | 6/1978 | Reiber | 221/210 X |
| 4,121,726 | 10/1978 | Pemberton | 221/213 X |
| 4,170,325 | 10/1979 | Pawlowski et al. | 221/194 X |
| 4,214,673 | 7/1980 | Heath et al. | 221/259 |
| 4,538,726 | 9/1985 | Pastva | 221/312 C X |
| 4,574,981 | 3/1986 | Jewett | 221/283 |
| 4,643,334 | 2/1987 | Steele | 221/63 |
| 4,676,396 | 6/1987 | Mamolou | 221/210 X |
| 4,781,307 | 11/1988 | Ferro | 221/131 |

FOREIGN PATENT DOCUMENTS

| | | |
|---|---|---|
| 456381 | 2/1928 | Fed. Rep. of Germany . |
| 804358 | 10/1936 | France . |
| 408788 | 3/1934 | United Kingdom . |

*Primary Examiner*—David H. Bollinger
*Attorney, Agent, or Firm*—Alfred M. Walker

[57] ABSTRACT

An apparatus for storing and individually dispensing coffee machine filters. The apparatus is of cylindrical construction with a resilient dispensing type applicator insertable in the cylinder to permit a coffee filter to be removed. A bottom, upwardly protruding base member is provided in the cylindrical interior to contact the reverse side of a stack of coffee machine filters. The apparatus has a manually operable applicator with a plurality of spring arms to compress against the stack of coffee filters while frictionally engaging the upwardmost filter of said filters. The applicator has extension arms with curved end portions for guiding the arms upon the surface of the upwardmost coffee filter and further has the coarse, tacky interior surface for frictionally engaging upon the upward surface of the filters.

2 Claims, 3 Drawing Sheets

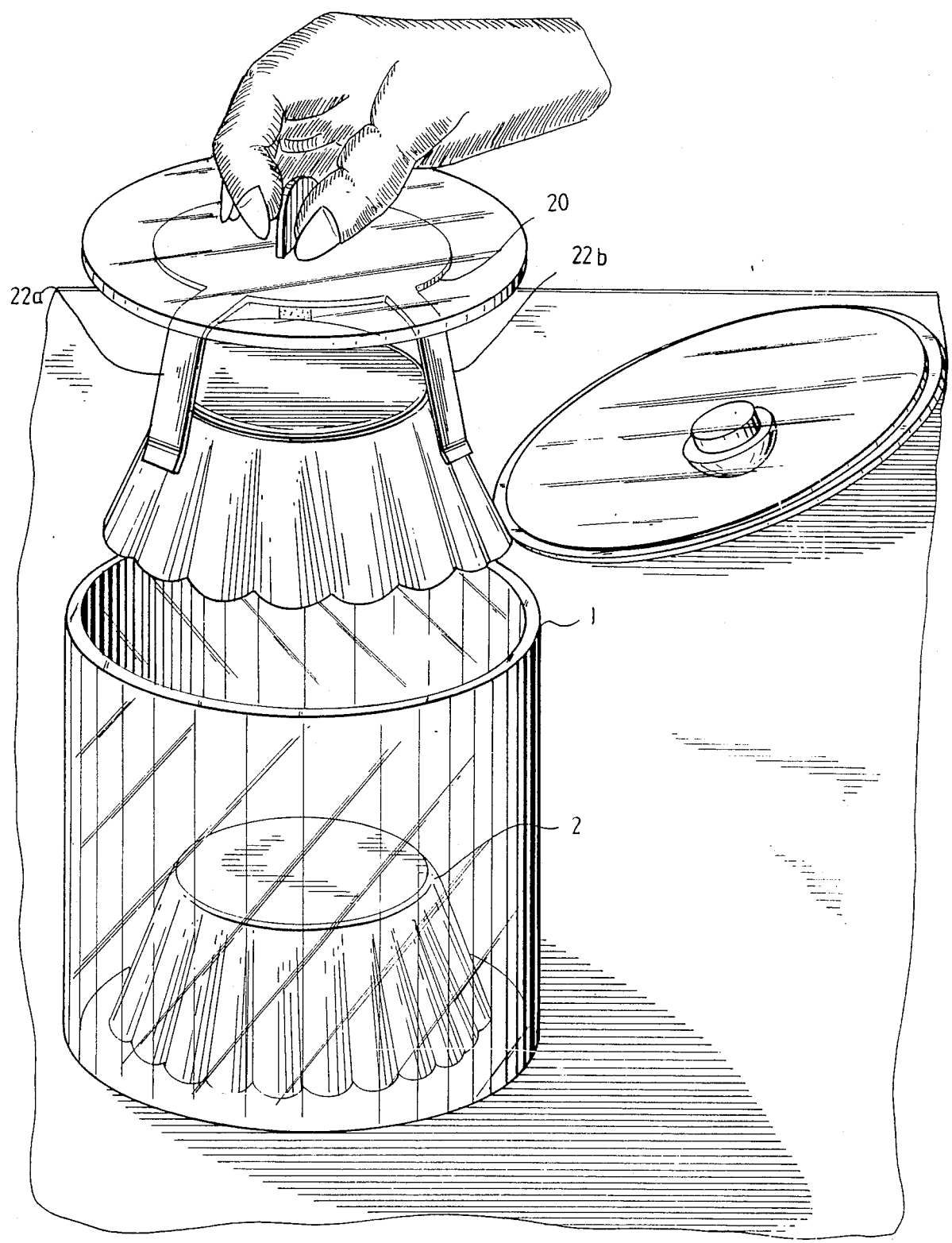

COFFEE FILTER DISPENSER

BACKGROUND OF THE INVENTION

This invention relates to containers for coffee filters as contents. More particularly, it relates to a container for singularly dispensing coffee filters in succession with an applicator for frictionally engaging single coffee filters contained therein.

DESCRIPTION OF THE PRIOR ART

Various patents are provided for dispensing articles arranged in stacks within tubular containers such as U.S. Pat. Nos. 4,781,307, 4,574,981, 4,170,325, 4,643,334, 3,776,419, 4,538,726, as well as German Patent No. 456 381 and French Patent No. 804.358.

Each of the aforementioned patents provide a tubular or box-like structure for holding and storing a vertical stack of objects such as cans, coffee cup tops and other lids by means of a downwardly positioned slot with various springlike appurtenances positioned therewith to facilitate the exiting of the articles from the container.

However, few means are available for dispensing thin, stacked coffee filters which by virtue of their frictional, tacky surface, tend to stick together, thereby preventing the individual dispensing of a singular coffee filter without removing a further plurality of coffee filters attached thereto. The removal of a single coffee filter is further complicated by the thin nature of the coffee filter which makes it difficult for a person to manually separate a single coffee filter from a stack of coffee filters.

Often, the only way to remove a single coffee filter is for a person to manually remove a plurality of filters and then to separate the filters one by one. This manual separation causes contamination of substances and the like from finger surfaces of the person removing the filters.

SUMMARY OF THE INVENTION

The difficulties encountered in the prior art are solved by the coffee filter dispenser which provides a frictionally engaged applicator to frictionally adhere to the surface of a single coffee filter and wherein the spring-like arms of the applicator compress the entire stack of coffee filters. Upon the upward release of the applicator, the spring-like arms compress inwardly upon a single coffee filter, adhering to the exterior surface of same, thereby causing the singular removal of one coffee filter upwardly from a cylindrical container. A rigid protruding base which conforms to the interior surface of the coffee filter stack is provided to permit the compression of the stack of coffee filters during the engagement of the applicator upon the stack of coffee filters prior to the upwardly release of the applicator with a single coffee filter. The applicator contains a generally flat base to accommodate the plurality of downwardly extending arms. This flat surface is generally constructed to conform to the interior surface of the cylindrical container so as to accurately cause the positioning of the applicator arms upon the stack of coffee filters.

BRIEF DESCRIPTION OF THE DRAWINGS

FIG. 5 is a perspective view of the device showing the removal of a single coffee filter.

DETAILED DESCRIPTION

Figure 1:
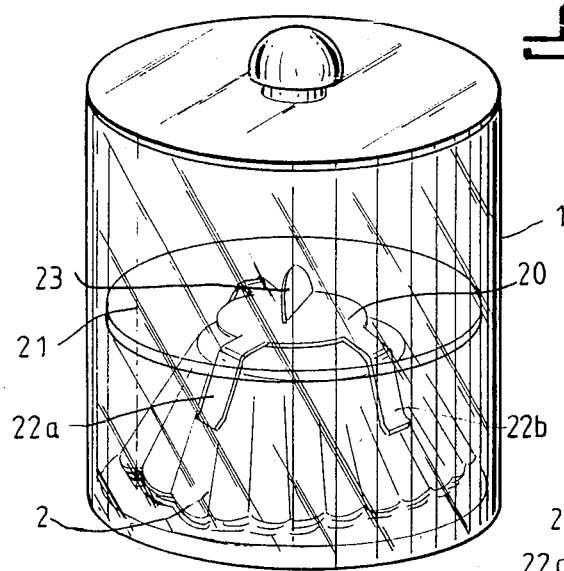
FIG. 1 is a perspective view of the dispenser in accordance with the present invention.

Referring now to the drawings a generally cylindrical container 1 is provided for removal of a single coffee filter from a stack of coffee filters 2 with an applicator 20 provided having a guiding base 21 and a plurality of spring-like arms 22a and 22b, together with a removal handle 23.

Figure 2:
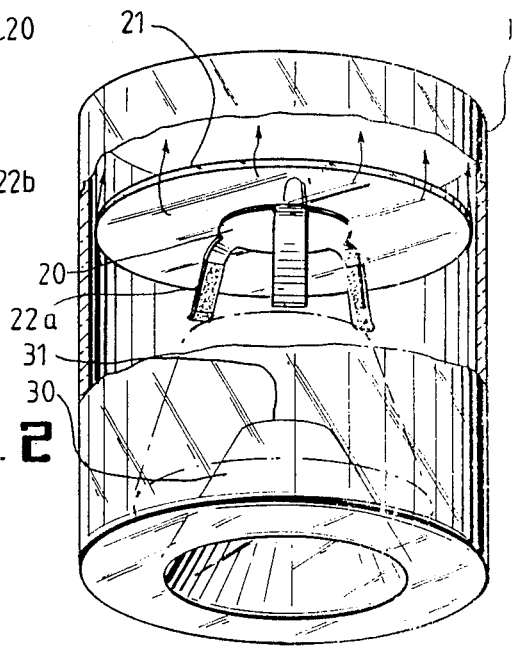
FIG. 2 is a perspective view from beneath the surface of the same.

As shown in FIG. 2 there is provided a protruding base 30 having a top 31. The base 30 is in the form of a protruding truncated cone capable of conforming to the interior surface of the stack of plurality of coffee filters to allow the compression of the plurality of filters upon exertion of downwardly extending pressure of the applicator arms 22a and 22b upon the stack of coffee filters 2.

Figure 3:
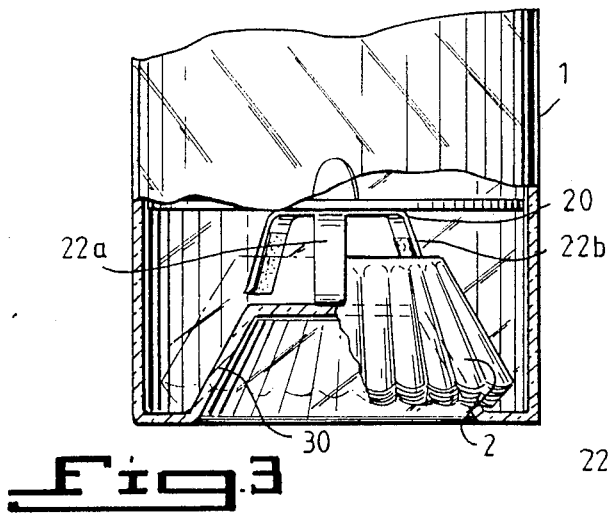
FIG. 3 is a partial elevational view of the same.
Figure 4:
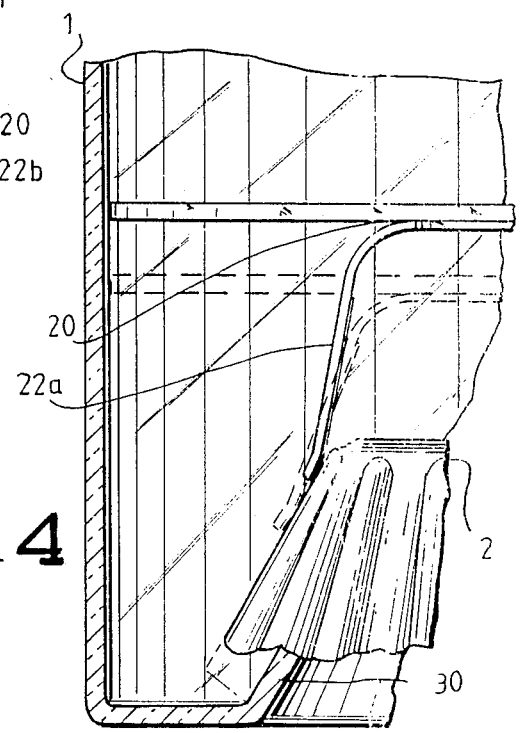
FIG. 4 is an enlargement of a corner of an elevational view in cross section of the same.
Figure 4A:
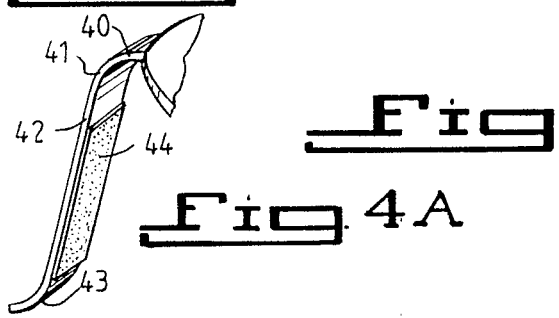
FIG. 4a is a closeup view of one arm of the applicator device of the invention.

As shown in FIGS. 3 and 4 the spring-like applicator arms 22a and 22b conform to the exterior surface of the stack of coffee filters 2. The compression of the spring arms 22a and 22b upon the surface of the coffee filters stack 2 causes a frictional engagement upon the thin, tacky surface of the upwardmost coffee filter. The adherence of the spring arms 22a and 22b is further facilitated by providing a frictional, coarse, tacky surface 44 upon the interior arm 42 of spring arm 22a. A further outwardly curved smooth portion 43 is provided for initially positioning the downwardly extending applicator arms upon the surface of the upwardmost coffee filter.

As shown in FIG. 5 the spring arms 22a and 22b frictionally engage the upwardmost coffee filter from the stack 2 upon the compression of the stack of coffee filters 2 against protruding truncated conical base 30. The upward removal of the applicator 20 causes the inward compression of spring arms 22a and 22b against the surface of the upward most coffee filter. Upon the upward removal of the applicator 20, the remaining compressed coffee filters in the stack 2 expand to their normal shape. However, because they are not frictionally engaged with a tacky surface 44 of the arm 42 portion of spring arms 22a and 22b, the remaining filters do not adhere to the upwardmost filter, thus permitting the singular removal of one coffee filter from the stack 2 of coffee filters.

In use, the plurality of porous coffee filters 2 are inserted in the open end of the cylindrical container 1 in a vertically stacked manner. A truncated conical base 30 is provided as a lower abutment means. The tacky surface 44 of arms 42 of spring arms 22a and 22b of the applicator 20 frictionally engage a portion of the uppermost filter in the stack 2. Simultaneously, the downward movement of the applicator 20 upon the stack of porous filters 2 causes the compression of the filters against the lower abutment truncated conical means 30, thereby causing the compression of the arms 22a and 22b against the stack of filters while also permitting the outward expansion of the filters to conform to the expanding conical surface of the coffee filters. As the arms 22a and 22b expand across the surface of the filters, they are guided by curved portions 43 of the arms 22a and 22b. A tacky coarse surface 44 of the inner side of arms 42 of spring arms 22a and 22b adheres to the porous, tacky surface of the coffee filter, frictionally engaging same.

Upon the upward removal of the applicator 20 the expanded arms 22a and 22b compress thereby gripping the surface of the upwardmost coffee filter by means of a coarse tacky surface 44. Because the tacky surface only engages a singular coffee filter, the compressed stack of coffee filters does not adhere to the tacky surface 44, thereby prevents the dispensing of more than one filter. This is accomplished because of the construction of the applicator which is arranged to limit the compressive engagement of the arms 22a and 22b upon a single coffee filter, thereby preventing the further removal of the lower coffee filters.

Consequently, singular coffee filters may be quickly and easily dispensed individually from the cylindrical containers 1 of the device by simple movement of one hand while at the same time restricting the contamination of the remaining filters.

Alternate embodiments are provided to permit the removal of coffee filters which are situated with the larger circumference edge extending upwardly. In this embodiment angular spring arms are provided to frictionally engage the interior of said coffee filters in the similar manner as provided above.

Figure 6:
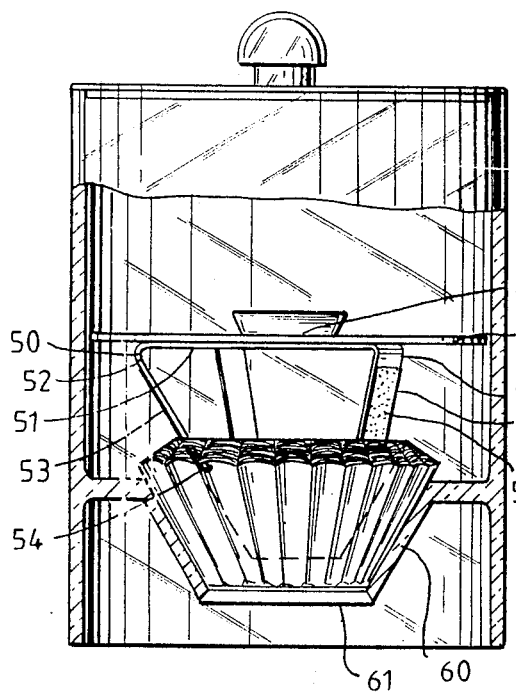
FIG. 6 is an elevational view with a cross sectional view of the cylindrical container showing another embodiment of the device.
Figure 7:
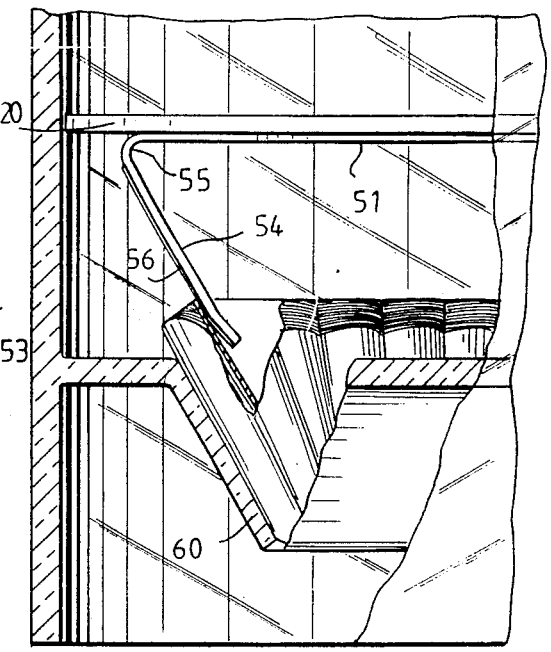
FIG. 7 is a closeup view of the device as shown in FIG. 6.
Figure 8:
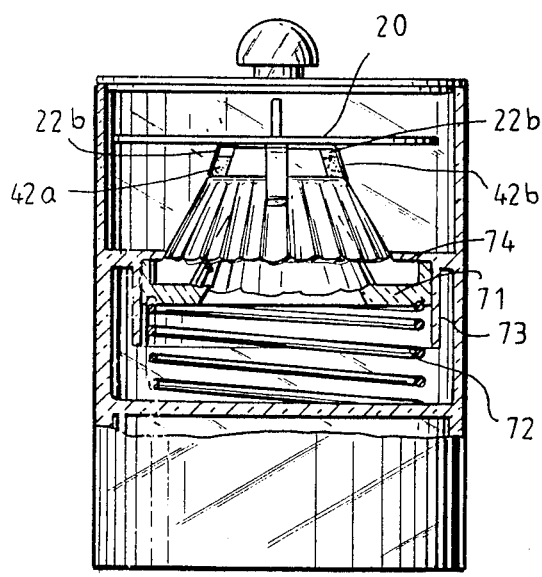
FIG. 8 is an elevational view with the container in cross section of another embodiment of the device.
Figure 9:
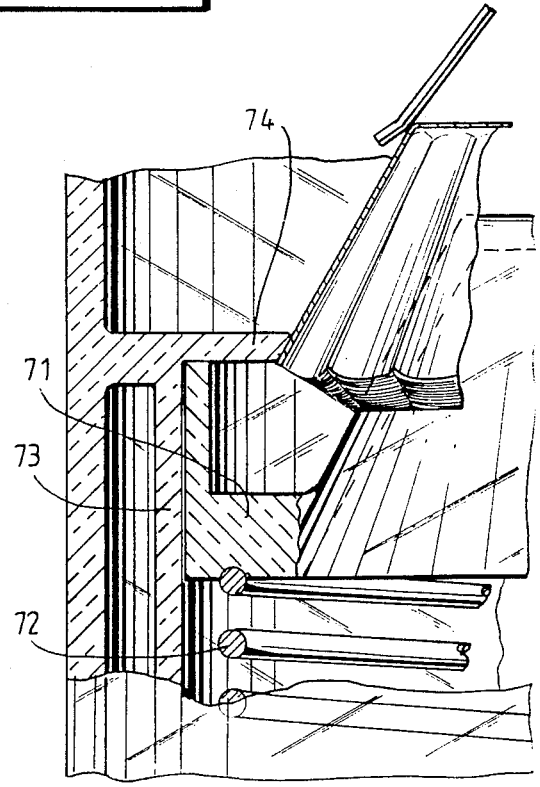
FIG. 9 is a closeup and cross section of the device as shown in FIG. 8.

As shown in FIG. 6 an alternate design is provided wherein a inverted truncated conical base 60 is provided to permit the reverse stacking of the coffee filters in a bowllike manner. The applicator 20 is provided with a base 51 having spring arms 50 and 55 extending at an angle from base 51 of the applicator 20 in such a manner to frictionally engage the interior surface of the upwardmost coffee filter by means of a tacky surface 56 upon the extending arm 54 of the spring arms 50 and 55 of the device.

Alternately a spring mechanism may be provided beneath the protruding base to facilitate the compression of the stack of coffee filters against the surface of the frictionally engaged arms 22a and 22b of the device.

In this further embodiment there is provided a spring like means for upwardly advancing the stack of coffee filters and further providing a compressive base with coil springs 72 to further compress the vertical stack of coffee filters so as to permit the adherence of a coffee filter to the tacky portion 44 of arms 42a and 42b of spring arms 22a and 22b of the applicator 20. An extension arm 74 is provided to locate and restrict the movement of the stack of coffee filters within the cylindrical container during removal.

The device as shown in the present invention, effectively allows the singular dispensing of coffee filters by means heretofore unknown in the art.

I claim:

1. A dispenser for singular, successive manual dispensing of coffee filters, said dispenser comprising
    an upright cylindrical container means provided with an interior capable of holding stacks of coffee filters;
    an upwardly extending protrusion base for supporting the stack of coffee filters;
    a manually operable applicator having a plurality of spring arms to compress against the said stack of coffee filters while frictionally engaging the upwardmost filter of said coffee filters;
    said plurality of spring arms conforming to the surface of the upwardmost filter of said stack of coffee filters, said spring like arms having an extension arm and a curved end portion for guiding the said arms upon the surface of the said upward most coffee filters;
    said arms further having a coarse, interior surface for frictionally engaging upon the upward surface of the upwardmost filter of said coffee filters.

2. A dispenser for singular, successive manual dispensing of coffee filters, said dispenser comprising:
    an upright cylindrical container means provided with an interior capable of holding stacks of coffee filters;
    an upwardly extending protrusion base for supporting the stack of coffee filters;
    a manually operable applicator having a plurality of spring arms to compress against said stack of coffee filters while frictionally engaging the upwardmost filter of said coffee filters;
    said plurality of spring arms conforming to the surface of the upwardmost filter of said stack of coffee filters, said spring like arms having an extension arm and a curved end portion for guiding the said arms upon the surface of the said upwardmost coffee filters;
    said arms further having a tacky interior surface for frictionally engaging upon the upward surface of the upwardmost filter of said coffee filters.

* * * * *